United States Patent [19]

Ozaki et al.

[11] Patent Number: 4,618,752

[45] Date of Patent: Oct. 21, 1986

[54] GAS-INSULATED INTERRUPTER

[75] Inventors: Yukio Ozaki, Amagasaki; Osamu Fujisawa, Kobe; Ryukichi Sakai, Itami; Hiroshi Hasegawa, Marugame, all of Japan

[73] Assignee: Mitsubishi Denki Kabushiki Kaisha, Tokyo, Japan

[21] Appl. No.: 693,894

[22] Filed: Jan. 23, 1985

[30] Foreign Application Priority Data

Jan. 24, 1984 [JP] Japan .................................. 59-9509

[51] Int. Cl.⁴ ............................................ H01H 33/54
[52] U.S. Cl. ............................ 200/148 R; 200/148 B; 200/144 R
[58] Field of Search ........... 200/148 R, 148 B, 150 B, 200/144 B, 144 R

[56] References Cited

FOREIGN PATENT DOCUMENTS 1228363 4/1971 United Kingdom ............ 200/150 B
1089659 2/1983 U.S.S.R. ........................... 200/144 B Primary Examiner—Robert S. Macon
Attorney, Agent, or Firm—Leydig, Voit & Mayer

[57] ABSTRACT

A gas-insulated interrupter comprising an interrupting unit, a hermetically-sealable housing enclosing the interrupting unit therein, and a pair of rigid terminal conductors connected to the interrupting unit at spaced positions is disclosed. The housing has formed therein a single opening sufficiently large to allow the interrupting unit and the terminal conductors as assembled to pass therethrough. The large single opening in the housing is closed by a single closure member rigidly supporting the terminal conductors and hermetically closing the opening in the housing while mechanically rigidly supporting the terminal conductors and the interrupting unit.

3 Claims, 2 Drawing Figures

GAS-INSULATED INTERRUPTER

BACKGROUND OF THE INVENTION

This invention relates to a gas-insulated interrupter, and more particularly to a gas-insulated interrupter of the type in which an interrupting unit is supported by a pair of terminal conductors extending through a hermetically-sealed housing.

An example of a conventional gas-insulated interrupter of the type with which the present invention is concerned is illustrated in FIG. 1. In the figure, the gas-insulated interrupter comprises a cylindrical metallic housing 1 including an end plate 2 and having in its cylindrical wall first and second openings 1a and 1b spaced apart from each other. The first opening 1a is hermetically closed by a source side lead-in terminal 4 comprising an electrically insulating molded member 4a and a rigid terminal conductor 4b secured to and extending through the insulating member 4a. The insulating member 4a has formed thereon a flange 4c for attaching the lead-in terminal 4 to the opening 1a. The second opening 1b is also hermetically closed by a load side lead-in terminal 5 similar to the source side lead-in terminal 4. The load side terminal 5 includes an electrically insulating molded member 5a with a flange 5c and a rigid terminal conductor 5b extending through the molded member 5a. Thus, the terminal conductors 4b and 5b are independently mechanically supported by the housing 1 through the insulating molded members 4a and 5a. The inner ends of the first and the second terminal conductors 4b and 5b support an elongated interrupting unit 10 having a stationary contact 6 connected to the first terminal conductor 4b and a movable contact 7 having sliding connectors 8 and 9 for slidably connecting the movable contact 7 to the second terminal conductor 5b. The upper end (as seen in FIG. 1) of the movable contact 7 can be brought into and out of electrical engagement with the stationary contact 6, and the lower (as seen in FIG. 1) end of the movable contact 7 is connected to an operating mechanism (not shown) as is well known in the art.

As described above, the conventional gas-insulated interrupter which the present invention concerns has two separate, relatively small openings 1a and 1b through which the terminal conductors 4b and 5b pass. Therefore, the assembly of the interrupting unit 10 and the connecting operation of the interrupting unit 10 to the terminal conductors 4b and 5b must be performed inside the housing 1. Thus, the assembly operation is difficult and the accuracy of assembling is poor. Also, since a space for the assembly operation is necessary inside the housing, the overall dimension of the interrupter are difficult to reduce.

SUMMARY OF THE INVENTION

Accordingly, an object of the present invention is to provide a gas-insulated interrupter in which assembly of the interrupting unit is easy.

Another object of the present invention is to provide a gas-insulated interrupter in which the interrupting unit and the terminal conductors can be assembled outside the interrupter housing.

With the above objects in view, a gas-insulated interrupter of the present invention comprises an interrupting unit, a hermetically-sealable, housing in which the interrupting unit is enclosed, a pair of rigid terminal conductors connected to the interrupting unit at spaced positions. The housing has formed therein a single opening sufficiently large to allow the interrupting unit and the terminal conductos as assembled to pass therethrough. The large single opening in the housing is closed by a single closure member rigidly supporting the terminal conductors and hermetically closing the opening in the housing while mechanically rigidly supporting the terminal conductors and the interrupting unit.

BRIEF DESCRIPTION OF THE DRAWING

The present invention will become more readily apparent from the following detailed description of the preferred embodiment of the invention taken in conjunction with the accompanying drawing, in which.

DESCRIPTION OF THE PREFERRED EMBODIMENT

Figure 1:
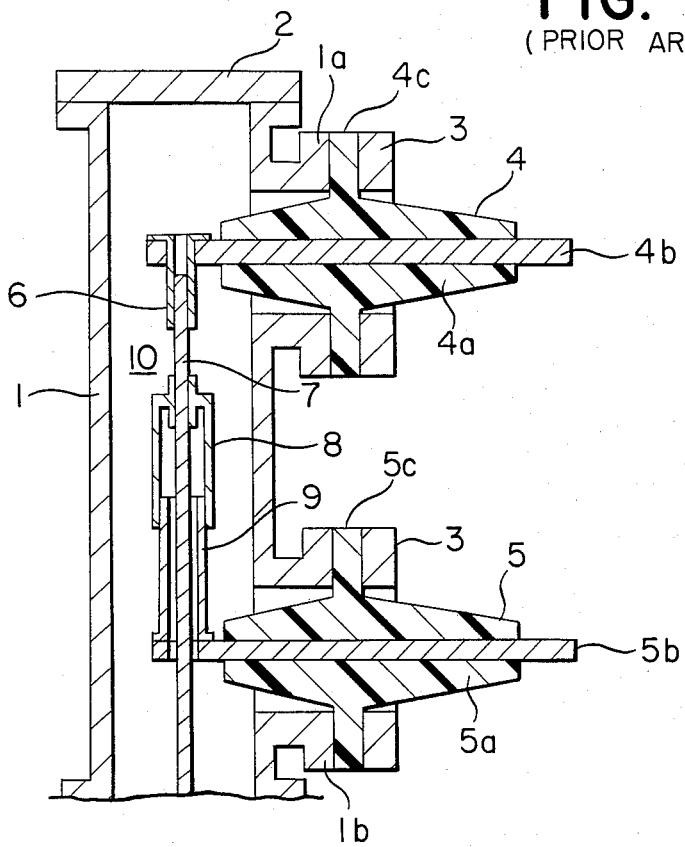
FIG. 1 is a sectional view illustrating a conventional gas-insulated interrupter of the type to which the present invention concerns.
Figure 2:
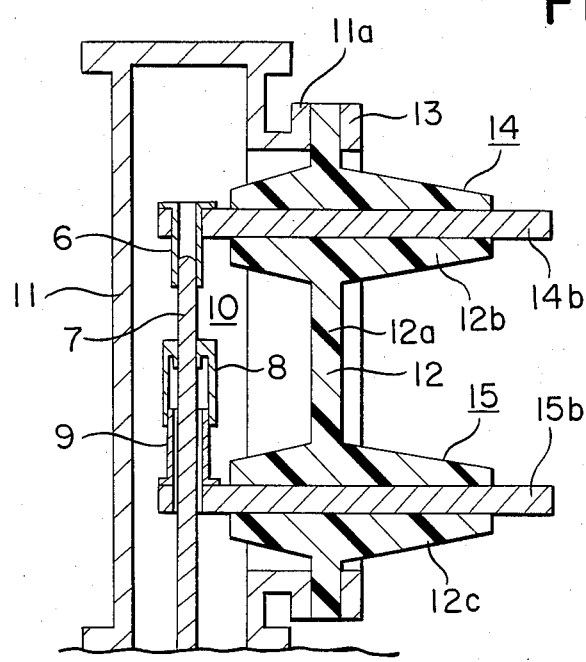
FIG. 2 is a sectional view illustrating a gas-insulated interrupter of the present invention.

A gas-insulated interrupter of the present invention as illustrated in FIG. 2 comprises a metallic hermetically-sealable housing 11 in which an interrupting unit 10 of the type described in conjunction with FIG. 1 is disposed. The housing 11 has formed therein a large opening 11a. The dimensions of the opening 11a are such that they allow the interrupting unit 10 as assembled to pass therethrough with the terminals connected. The interrupting unit 10 comprises a stationary contact 6, a movable contact 7, and sliding sleeve connectors 8 and 9. Although not illustrated, the movable contact 7 is connected to an operating mechanism for movement between closed and open positions, as is well known. The stationary contact 6 of the interrupting unit 10 is rigidly supported by the inner end of a rigid terminal conductor 14b of a source-side terminal 14, and the stationary sleeve 9 of the sliding sleeve connectors 8 and 9 of the interrupting unit 10 is rigidly supported by the inner end of a rigid terminal conductor 15b of a load-side terminal 15. Therefore, the terminal conductors 14b and 15b extend parallel to each other and are spaced apart by a distance corresponding to the length of the interrupting unit 10. The terminal conductors 14b and 15b are both supported by a single electrically insulating molded member 12. The insulating molded member 12 in the illustrated embodiment is a single-piece member having a plate-like portion 12a and two parallel bushing-like portions 12b and 12c through which the terminal conductors 14b and 15b, respectively, extend. In other words, the molded member 12 is a member in the shape of two flanged bushing-like insulators 12b and 12c connected at their flanges 12a to each other to form a one-piece terminal member 12. The terminal member 12 is secured to a flange of the opening 11a at the flange 12a or at the edge of the plate portion 12a by a ring-shaped retainer 13 including bolts (not shown). The hermetic housing 11 is filled with an electrically-insulating gas such as $SF_6$ gas.

When the unillustrated operating mechanism pulls down the movable contact rod 7, the sliding sleeve connector 8 fixedly mounted on the movable contact rod 7 slides along the connector sleeve 9 rigidly secured to the inner end of the second terminal conductor 15b while maintaining the electrical connection therebetween. This movement of the movable contact rod 7 causes the movable contact 7 to separate from the stationary contact 6 to open the circuit to be switched.

As has been described, the hermetic housing of the gas-insulated interrupter of the present invention has formed therein a large single opening sufficiently large to allow the passage of the interrupting unit as assembled together with the terminal conductors therethrough, and the large single opening is closed by a single electrically insulating member. Therefore, the assembly of the interrupting unit and the connecting operation of the interrupting unit to the terminal conductors can be performed outside the housing. Thus, the assembling operation is easy and accuracy of assemblage is superior. Also, since a space for assembling operation is not necessary inside the housing, the overall dimension of the interrupter can greatly be reduced.

What is claimed is:

1. A gas-insulated interrupter comprising:
   an interrupting unit;
   a pair of rigid terminal conductors connected to and extending substantially parallel to each other from said interrupting unit at spaced positions, each one of said terminal conductors having connector elements extending toward the other of said terminal conductors and forming part of said interrupting unit;
   a hermetically-sealable housing enclosing said interrupting unit, said housing having therein a single opening sufficiently large to allow said interrupting unit and said terminal conductors, including said connector elements, as assembled to pass therethrough to locate said connector elements within said housing;
   means secured to said terminal conductors for hermetically closing said opening in said housing while mechanically rigidly supporting said terminal conductors and said interrupting unit; and
   an electrically insulating gas disposed within said housing.

2. A gas-insulated interrupter as claimed in claim 1 wherein said closing means comprises a molded integral piece made of an electrically insulating material.

3. A gas-insulated interrupter as claimed in claim 1 wherein said housing and said interrupting unit are elongated members coaxially disposed with respect to each other, and said terminal conductors extend substantially radially parallel to each other with said connector elements extending parallel to said housing for cooperation with said interrupting unit.

* * * * *